July 22, 1952  L. W. MEAD ET AL  2,604,598
IONIZATION CHAMBER FOR NEUTRON FLUX MEASUREMENTS
Filed Nov. 15, 1949
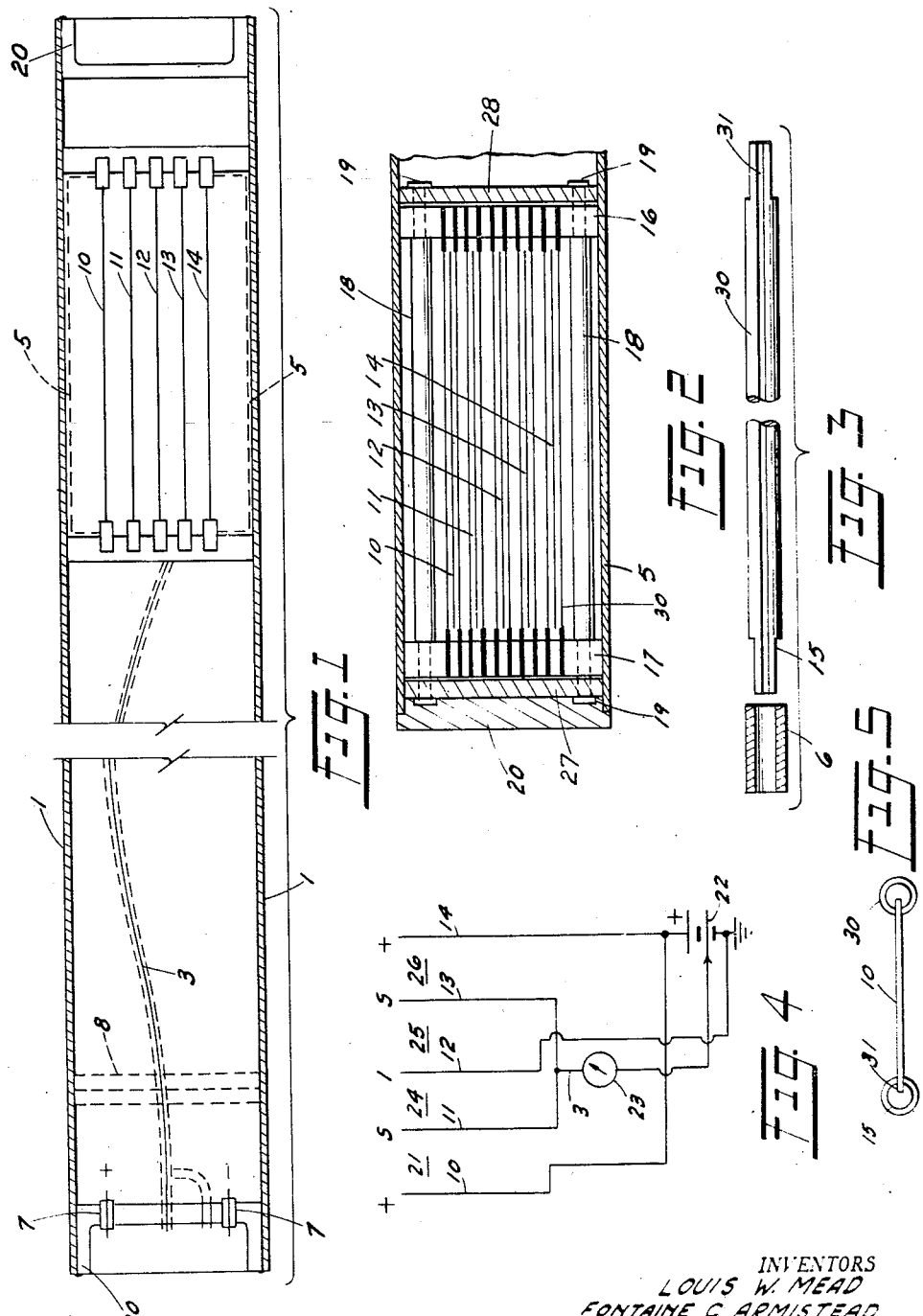
INVENTORS
LOUIS W. MEAD
FONTAINE C. ARMISTEAD
BY Patented July 22, 1952

2,604,598

UNITED STATES PATENT OFFICE 2,604,598

IONIZATION CHAMBER FOR NEUTRON FLUX MEASUREMENTS

Louis W. Mead, Chicago, Ill., and Fontaine C. Armistead, Marblehead, Mass., assignors to the United States of America as represented by the United States Atomic Energy Commission Application November 15, 1949, Serial No. 127,416

3 Claims. (Cl. 313—61)

Our invention relates to radiation detectors, and more particularly to ion chambers having a high degree of sensitivity and a low degree of induced radioactivity in the materials of the components, and which may be especially useful in measuring the neutron density in high flux thermal piles.

In the prior art of neutron detection it has been the practice to coat electrodes with some active metal such as boron or lithium. Incident neutron radiation would cause the boron or lithium nucleus to absorb the neutron and emit an alpha particle, which in turn, could ionize the gas molecules of an ionization chamber. The ion current was collected and the intensity thereof was a measure of the neutron flux to which the chamber was exposed. (See Brons, 2,200,509, and Kallmann, et al., 2,288,718.)

However, the usefulness of the devices of the prior art were limited by the range of neutron flux values over which these devices would operate. This is known as the effective range and has also been defined as the ratio of the ionization current, during exposure to neutron flux, to the current produced by the neutron-induced, residual beta and gamma activity within the chamber 30 minutes after its removal from the flux. In short, the effective range over which the chamber will give accurate results is generally limited by the background current due to radioactivity induced in the chamber itself, and also the sensitivity of the electrodes.

The background currents were contributed to or determined by the induced activity in the materials of the ionization chamber, and the sensitivity was controlled by the quality of the coating on the electrodes. Other factors such as gas-leakage and ruggedness of the envelope, also deterioration of electrode mounting insulators under exposure to the high intensity radiations affected the performance or usefulness of the device.

Applicants with a knowledge of all these problems in the prior art have for an object of their invention the provision of a neutron sensitive ionization chamber which has an increased range and improved sensitivity.

Applicants have as another object of their invention the provision of an ionization chamber for measuring neutron flux employing materials which have a minimum neutron induced radioactivity.

Applicants have as another object of their invention the provision of an ionization chamber for measuring neutron flux having electrodes with improved neutron sensitive coatings thereon.

Applicants have as a further object of their invention the provision of an ionization chamber for measuring neutron flux which has low gas leakage.

Applicants have as a still further object of their invention the provision of an ionization chamber for measuring neutron flux which is rugged, and which will withstand the heat, shocks, strains and other conditions to which it may be subjected.

Other objects and advantages of our invention will appear from the following specification and accompanying drawings and the novel features thereof will be particularly pointed out in the annexed claims.

In the drawings, Fig. 1 is a schematic of one form of our improved ionization chamber. Fig. 2 is a longitudinal elevation of the active portion of our improved ionization chamber. Fig. 3 is a detail of one of the electrode mounting rods and the insulating sleeve for mounting it in an end disk of our improved ionization chamber. Fig. 4 is a schematic of the connections between the electrodes and measuring circuit for our improved ionization chamber. Fig. 5 is a cross sectional view of one of the electrodes and its mounting rods.

Among the commonly available materials, graphite and lead combine the smallest neutron absorption cross section with comparative freedom from radiation damage. Actually, graphite activates somewhat less than lead and since it was found to be more easily purified and had better dimensional stability than lead, it was preferable to make the electrodes of graphite alone. Magnesium, the substance found to be the least subject to activation among those having strength, machineability, lightness and availability, was used for the outer shield or casing.

At low neutron fluxes and using a supply voltage of several hundred volts, essentially 100% of the ions are collected. At the highest fluxes, however, less than 100% are collected since the higher ion concentrations are accompanied by appreciable recombination in the gas region. The rate of recombination increases with gas pressure and with electrode separation. As the ionization chamber primarily measures alpha radiation, there is no great advantage in using pressures materially above atmospheric pressure and so the chamber is designed for that range of pressures. The electrode separation should be made as small as possible, but for maximum sensitivity the separation should be at least equal to the alpha particle range. The sensitivity at first falls off very slowly as the electrode spacing becomes less than the alpha particle range. A spacing of the order of one-fourth to three-eighths inches has been found to be satisfactory since this is about as small as convenient and yet is 90% of the 7 mm. alpha particle range. At this spacing less than 1% of the potentially available current is lost.

Since the chamber will be sensitive to gamma and beta radiation as well as neutron flux, it is desirable to reduce the background current resulting therefrom. This may be effectively accomplished by providing compensating sensitive volumes so that the current therefrom may be differentially connected with respect to the neutron sensitive volumes to balance out these background currents.

Referring to the drawings in detail and more particularly to Figs. 1 to 3, inclusive, an outer shield or tube 1, preferably about 15 feet long and about four inches in diameter, is provided to house the sensitive volume and associated equipment. It is substantially cylindrical in shape and is gas tight. Disposed within the casing or shield, adjacent one end thereof, is an active portion which includes a cylinder 5 preferably of chemical lead or aluminum of about one-thirty second inches in thickness, having a series of spaced parallel plates 10, 11, 12, 13 and 14 extending longitudinally thereof and mounted along their longitudinal or side edges which seat in longitudinal grooves 31 in mounting rods 30. A pair of mounting rods 30 are employed to mount each electrode or plate since they extend along and receive the edges thereof, as indicated in Fig. 5. The ends 15 of the mounting rods 30 are reduced and seat in quartz insulators 6 carried in sockets in disks 16, 17 disposed within the cylinder 5. This structure is maintained in assembled relation by assembly rods 18, 18 which bridge the space between the sets of disks 16, 17 and have screw threaded sockets in their ends to receive screws 19 which extend through the openings in the disks 16, 17 and co-act with the threaded sockets of the rods 18. The screws 19, 19 are carried by and pass through the ends 27, 28 which serve to limit the movement of the sleeve insulators 6 and prevent their removal from disks 16, 17.

In the above arrangement some of the electrodes or plates 10, 11, 12, 13 and 14 were preferably coated with boron-10 or some other suitable neutron sensitive material as described more in detail hereinafter. All of the plates or electrodes are preferably of graphite about 2¾" x 10" x 1/16", and are spaced about three-eighths inches apart. The coating is a deposit from a suspension preferably of boron-10 of about 2.5 mg./cm.². It may be sprayed or painted on the surfaces of the electrodes and then permitted to dry, or it may be subjected to baking. Since the chamber is internally compensated, as indicated hereinafter, it will only have one signal lead 3 and two high voltage leads (only partially shown). The signal lead 3 preferably consists of a number 30 iron wire insulated from a one inch magnesium or lead tube or foil by a 3 mm. quartz tubing held by quartz disks spaced at one foot intervals.

The one inch thick magnesium or lead tube 3 will be bent in such a manner that pile radiations will not be able to follow a straight path through it. The high voltage leads (only schematically indicated) consist of number 30 iron wire insulated with 3 mm. quartz tubing. All leads will pass through Kovar seals 7, eutectic soldered in a plate or cup shaped end 20 at one extremity of the tube. Magnesium plates or ends 20, 20 will be positioned in the tube adjacent its extremities, and will be welded to both ends or edges of the four inch tubing to give a gas tight seal. The space between the active portion 5 of the chamber and the Kovar seals will be filled with some sort of hydrogenous material such as paraffin, if the temperatures permit, to slow down the fast neutrons. Positioned adjacent one end are spaced boron plastic plates 8 which will act as slow neutron absorbers. The chamber will be filled with nitrogen at slightly greater than atmospheric pressure. This pressure may be measured by the gauge on the end of the tube 1.

The five electrodes 10, 11, 12, 13 and 14, indicated schematically in Fig. 4, are flat plates and this configuration was chosen rather than the cylindrical configuration for ease of coating, simplicity of removal, and convenience of storage and handling. The outer plates 10, 14 are maintained at a high positive potential by source 22 while intermediate plates 11, 13 are at an intermediate positive potential, and the inner electrode 12 is at ground potential. The intermediate electrodes 11, 13 serve as the signal electrodes and are connected through the signal lead 3 to meter 23, which meter may take the form of a current meter, galvanometer or D. C. current amplifier. The meter 23 is, in turn, connected to the source of potential at an intermediate point. In this arrangement, they define chambers 21, 24, 25 and 26, with the electrodes 11 and 13, coated with a neutron sensitive coating such as boron on their innerfaces, and the center electrode 12 coated with this material on both faces or surfaces. When the chamber is subjected to neutron flux as from a high flux pile, it produces ionization only in chambers 24 and 25 by striking the boron coating where a neutron is absorbed and an alpha particle is emitted. Collection of the alpha particles resulting from neutron absorption gives a measure of the neutron flux density. However, radiations such as beta and gamma rays also produce ionization in these chambers and the current from electrodes 11 and 13 to electrode 12 as a result thereof would tend to limit the accuracy and/or range of the measurement of the neutron flux density which have also produced ions collected by the electrode 12. To overcome this objectionable feature, additional ion chambers 21 and 26 serve as compensating chambers since their electrodes are not coated with boron and since they are only responsive to ionization due to beta and gamma radiations. They may be connected in opposition to chambers 24 and 25 and may thus cancel out the effects of beta and gamma radiations in those chambers.

In measuring the flux of a pile, the ion chamber and tube are inserted in instrument holes in the pile (not shown). There are likely to be large flux gradients in these instrument holes. The optimum position for this chamber is at the pile shield interface where the flux is $6 \times 10^9$ neutrons/cm.²/sec. at 3800 kw. power, and the relaxation length, that is, the distance in which the flux falls by a factor $e$, is about three inches. Since in the high flux pile it is expected that this value of flux density will be found near the reflector shield interface, it is probable that a similar flux gradient would exist there. When the flux falls off exponentially, it is clear that little can be gained by increasing the length of the chamber over about one relaxation length, or in this case, three inches. It is also clear that insulators and support structures should be placed as far back from the sensitive part of the chamber as possible in order to minimize the radiation incident on them. The front end of the chamber should have a maximum of insensitive area with a minimum of support structure.

Having thus described our invention, we claim:

1. A radiation measuring system of the character described comprising an elongated housing, a tubular body disposed within the housing and extending longitudinally thereof for defining a sensitive volume, a series of longitudinally extending plates positioned in spaced relation in the body to define four ionization chambers, a neutron sensitive coating on the plates of two of said chambers for rendering them sensitive to both neutron and other radiation, and means for coupling said coated plates to a measuring device in opposition to the uncoated plates so that the effects of ionization from said other radiation in two of said chambers with coated plates will balance out the effects from the two chambers with uncoated plates and provide an indication of neutron flux.

2. A radiation detecting device of the character described comprising a hollow cylindrical body for providing a sensitive volume, a series of plates in the body for defining a plurality of ionization chambers, said plates extending longitudinally of the body in parallel spaced relation, and means for supporting the plates in spaced relation, said means including a pair of ends bridged by plate engaging rods.

3. A radiation detecting device of the character described comprising a hollow cylindrical body providing a sensitive volume, a series of plates disposed within the body and extending longitudinally thereof in spaced relation to define a plurality of ionization chambers, and means for supporting said plates, said means including a pair of ends bridged by a plurality of rods extending parallel to said plates, said rods being insulated from said ends and having longitudinal grooves therein for interlocking engagement with the edges of the plates.

LOUIS W. MEAD.
FONTAINE C. ARMISTEAD.

REFERENCES CITED

The following references are of record in the file of this patent:

UNITED STATES PATENTS

| Number | Name | Date |
|---|---|---|
| 2,088,584 | Bucky | Aug. 3, 1937 |
| 2,288,718 | Kallmann et al. | July 7, 1942 |
| 2,349,753 | Pontecorvo | May 23, 1944 |
| 2,440,167 | Broxon et al. | Apr. 20, 1948 |
| 2,493,935 | Wiegand et al. | Jan. 10, 1950 |